United States Patent [19]

Guzik et al.

[11] Patent Number: 4,828,153
[45] Date of Patent: May 9, 1989

[54] DETACHABLE BELT CLIP ASSEMBLY

[75] Inventors: Andrzej T. Guzik, Pompano Beach; William J. Kuznicki, Coral Springs; Serafima Tsatskin, Plantation, all of Fla.

[73] Assignee: Motorola, Inc., Schaumburg, Ill.

[21] Appl. No.: 763,899

[22] Filed: Aug. 9, 1985

Related U.S. Application Data

[63] Continuation of Ser. No. 559,131, Dec. 7, 1983, abandoned.

[51] Int. Cl.⁴ .............................................. A45F 5/02
[52] U.S. Cl. .................................... 224/242; 224/247; 224/252; 224/268; 224/269; 224/904
[58] Field of Search ............... 455/344, 345, 346, 347, 455/348, 349, 350, 351; 224/242, 247, 248, 252, 253, 255, 268, 269, 270, 271, 904, 914

[56] References Cited

U.S. PATENT DOCUMENTS

| D. 243,409 | 2/1977 | Eckmann et al. |
|---|---|---|
| D. 248,759 | 8/1978 | Eckmann et al. |
| D. 251,561 | 4/1979 | Toth et al. |
| D. 262,965 | 2/1982 | Iwata . |
| D. 264,080 | 4/1982 | Iwata . |
| 1,911,256 | 5/1933 | Andrew ............................ 224/252 |
| 2,926,403 | 3/1960 | Weissman ......................... 224/269 |
| 3,179,891 | 4/1965 | Sharma . |
| 3,244,981 | 4/1966 | Der Tatevasian . |
| 3,370,236 | 2/1968 | Walker . |
| 3,631,994 | 1/1972 | Mackrum, Jr. . |
| 3,878,589 | 4/1975 | Schaefer . |
| 3,956,701 | 5/1976 | James, Jr. . |
| 4,046,295 | 9/1977 | Eichler . |
| 4,083,481 | 4/1978 | Selinko . |
| 4,111,343 | 9/1978 | Selinko . |
| 4,299,344 | 11/1981 | Yamashita et al. ................ 224/252 |
| 4,325,142 | 4/1982 | Nakazawa . |

OTHER PUBLICATIONS

Multitone "Pocsag Paging Receiver" Catalog Sheet (2pgs).
Alexander Battery Sales, Inc. "Porta Chip" Catalog Sheet (2pgs.).
Skydyne ® Catalog Sheet (3pgs, best available copy).
other references Design Patent Application No. 06/519,452, filed Aug. 1, 1983.

Primary Examiner—Henry J. Recla
Attorney, Agent, or Firm—Daniel K. Nichols; Vincent B. Ingrassia; Anthony J. Sarli, Jr.

[57] ABSTRACT

A detachable low profile mounting clip arrangement suitable for use with a portable hand-held electronic apparatus such as a paging receiver, includes a housing having a slot. A base member has a hook attached to one end and a pair of apertures at the other end. The hook engages in the slot of the housing while the apertures spring over a pair of wedge shape protuberancies in the housing and snap into place. A mounting clip or lanyard is attached to the base member.

10 Claims, 3 Drawing Sheets

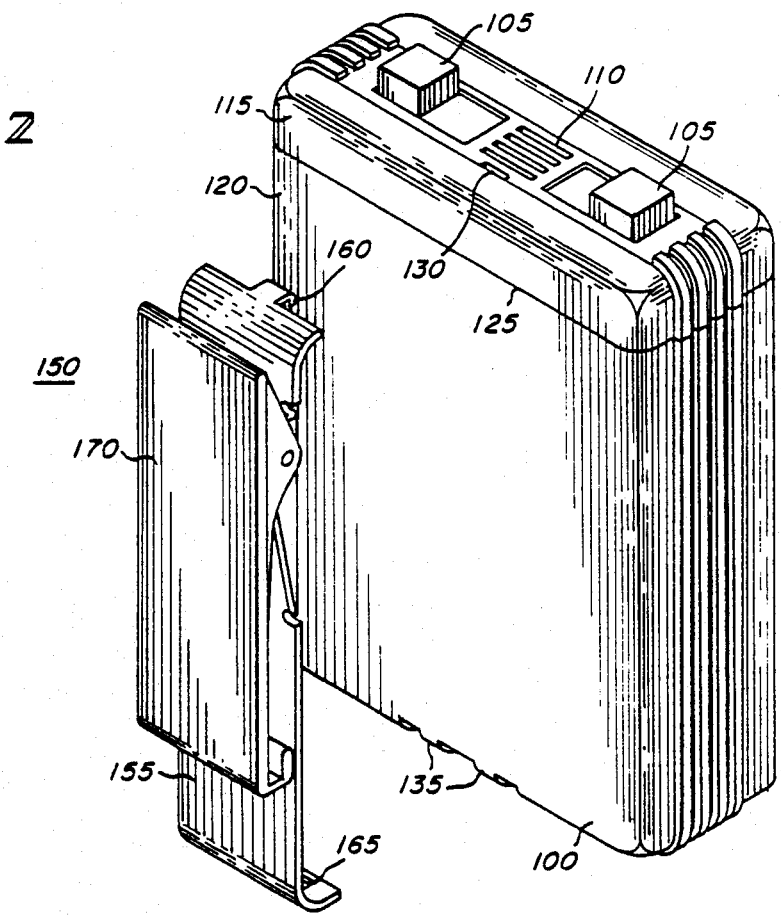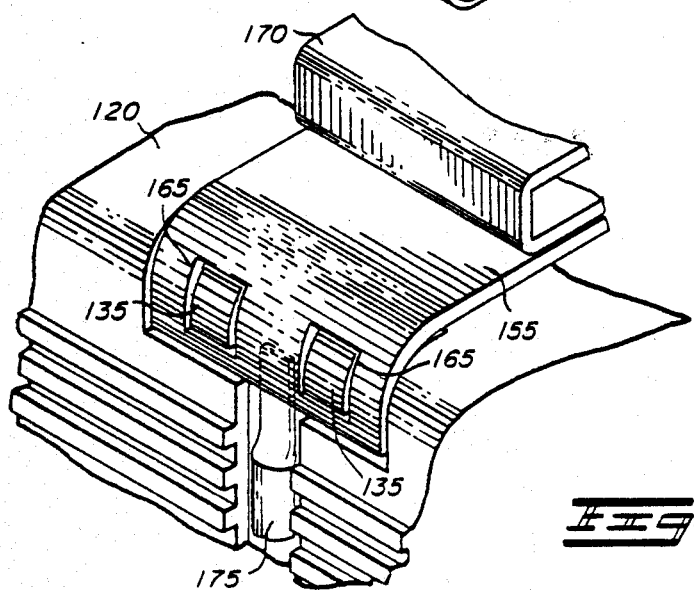

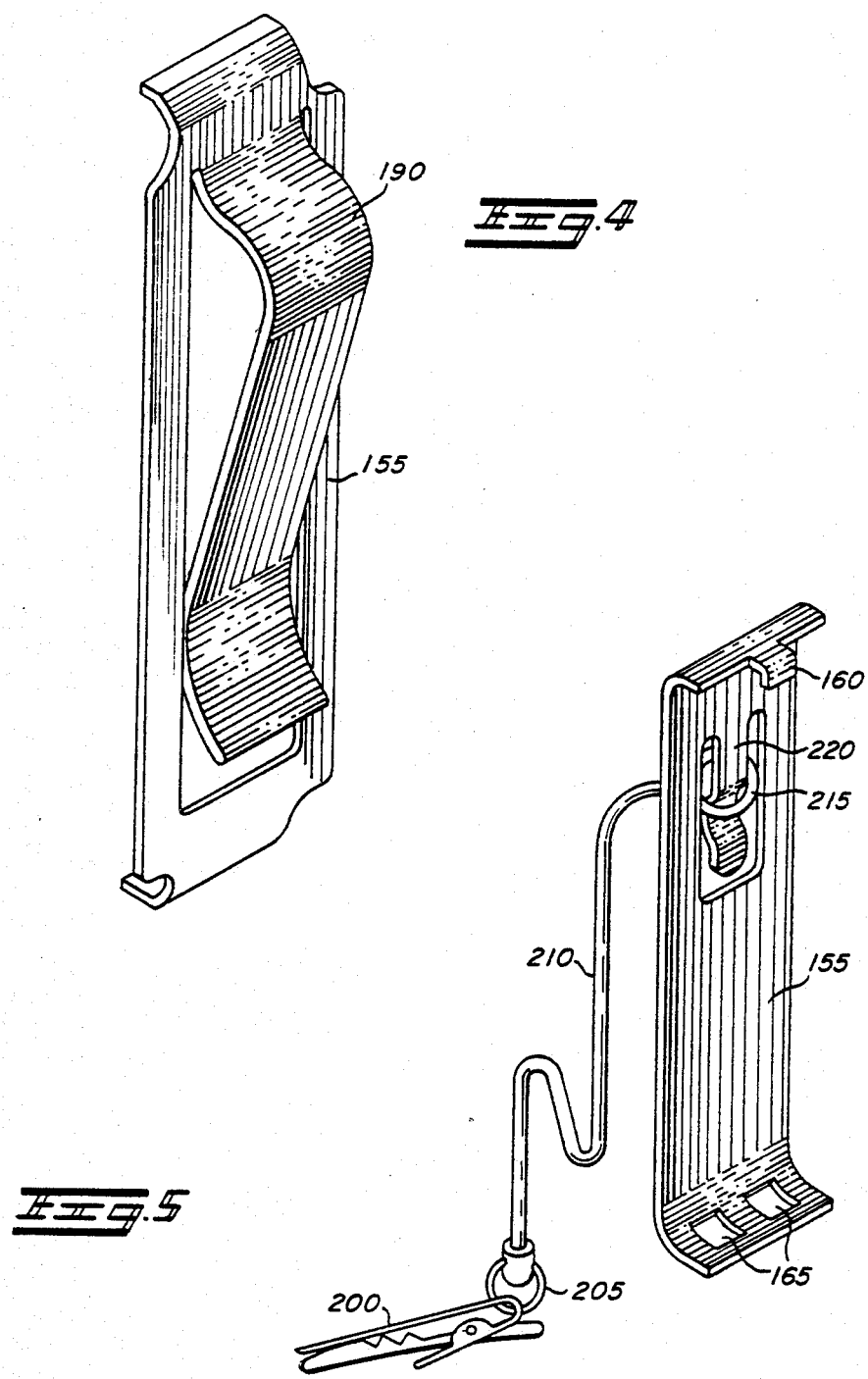

DETACHABLE BELT CLIP ASSEMBLY

This is a continuation of application Ser. No. 559,131, filed Dec. 7, 1983, abandoned.

CROSS REFERENCE TO RELATED APPLICATION

In a copending patent application, entitled "Twist Off Detachable Mounting Clip", to Charles Mooney, et al, Ser. No. 559,130, filed Dec. 7, 1983, now abandoned, filed of even date herewith and assigned to the assignee of the present invention, a removable mounting clip utilizing a twist-off arrangement is disclosed and claimed. The contents of said copending patent application is hereby incorporated by reference.

BACKGROUND OF THE INVENTION

1. Field of the Invention

This invention relates generally to the field of mounting clip assemblies for miniature electronic devices such as paging receivers. More particularly, this invention relates to the field of detachable or removable mounting clip assemblies which are readily interchangable or omitted from a paging receiver without causing user discomfort or sacrifice of asthetic appeal. Furthermore, the easy detachability results in improved repairability at reduced cost.

2. Background of the Invention

Mounting clips of various configurations have been used for a number of years in portable electronic devices such as paging receivers. One of the more conventional type is a spring loaded belt clip as shown in FIG. 1 which serves as an attaching mechanism allowing the user to rapidly and securely attach the pager or other electronic device to the user's belt, pocket or purse to make the device conviently accessible yet securely mounted.

An exemplary prior art belt clip is used in the Motorola Page Boy II ™ pager which is shown in FIG. 1 in an exploded view. This pager includes a plastic housing frame 10, which serves as the primary housing for the internal electronic circuitry. A substantially U-shape housing cover 15 is made of metal and slides into slots 20 in the housing frame 10. An opening 25 at the top of the housing cover 15 allows access to controls which are mounted on housing frame 10. Metal housing cover 15 is also utilized as the paging receiver's antenna in the Motorola Page Boy II ™.

On the rear surface of housing cover 15, a pair of tabs 30 are punched from holes 35 and bent outwardly at a right angle to the rear surface of housing cover 15. Each of these tabs 30 additionally has a circular hole 40 punched through them. The center of circular holes 40 lie along a substantially coaxial line.

A lanyard bracket 45 which is also somewhat U-shaped has a circular hole 50 on each side which is made to allign with circular holes 40 when lanyard bracket 45 is inserted through holes 35 from the inside of housing cover 15. On one end of layard bracket 45 is a lanyard mount 55 including a hole for attaching a lanyard when it is desirable to suspend the pager from a lanyard.

A belt clip style mounting clip 60, including a passage 65 running through it, is attached to the housing member 15 by means of a roll pin 70. A torsion type coil spring 75 is utilized to keep belt clip 60 in position so that the lower portion of clip 60 presses against housing member 15 thereby entrapping the user's belt, purse, etc.

When assembled, the roll pin passes through circular hole 40 to circular hole 50 into one side of passage 55, through the coil spring 75 and out the other end of passage 65 to the other circular hole 50 and the other circular hole 40. Primary support for the belt clip 60 and lanyard bracket 45 is provided by tabs 30 and roll pin 70. In order to open the belt clip, the user has simply to pull on the bottom of the belt clip away from housing cover 15, or push on the top of belt clip 60 toward the housing cover 15. The spring action of coil spring 75 normally urges the clip closed when pressure is released.

Although the assembly of FIG. 1 functions well in normal use, as technology allows for more miniaturization of paging receivers or similar electronic devices, the user may prefer to simply carry the paging receiver in his pocket without being burdened by what would then become the excess bulk of a mounting clip. When a clip is desired, the user of the prior art belt clip assembly has only on choice as to what belt clip assembly he prefers and that choice must be made at the time of purchase. Replacement of belt clip 60 with a different style is difficult requiring the service of a technician. If no clip at all is desired, the user is left with mounting tab 30 protruding from the cover of housing member 15 creating an annoying discontinuity in the pager's contour which could cause user discomfort, or damage to the user's clothing and is generally not asthetically pleasing.

A detachable mounting clip arrangement for a portable paging receiver or the like is disclosed in U.S. Pat. No. 4,083,481 to George Selinko and assigned to Motorola Inc. (the assignee of the present invention). In this invention, the clip arrangement includes a tapered base plate assembly designed to insert within a recess in the housing formed by two undercut sidewalls. The base plate is retained within these recesses by a ratchet-like serated section included on the housing surface which interacts with a resilient finger extending laterally from the base plate. The base plate itself supports a conventional pivotal mounting clip assembly similar to that shown in FIG. 1 of the present application.

While this prior art mounting clip arrangement meets the needs and objectives set forth the patent; the needs of the present invention (which include many of the objectives of Selinko's clip) extend beyond those objectives. The present mounting clip interacts with the housing in a manner which does not detract from the visual appearance of the pager if the belt clip assembly is removed. Furthermore, the belt clip assembly of the present invention adds a substantial amount of rigidity to the pager housing with improved ease of assembly and disassembly.

SUMMARY OF THE INVENTION

It is an object of the present invention to provide an improved low profile belt clip assembly.

It is another object of the present invention to provide a removable belt clip assembly which does not detract from the visual appearance of a radio housing when the clip assembly is removed.

It is another object of the present invention to provide a belt clip assembly for a miniature receiver housing which adds to the rigidity of the receiver housing.

It is a further object of the present invention to provide an improved belt clip assembly which is readily interchangeable with other belt clip assemblies and easily replaced in the event of damage without the need for service personel.

These and other objects of the invention will become apparent to those skilled in the art upon consideration of the following description of the invention.

In one embodiment of the present invention, a detachable mounting clip arrangement especially adapted for use in conjunction with the housing of a hand-held apparatus to be worn on the person includes a base member having first and second ends. A hook is attached to the first end of the base member and is adapted to engage a hook receiving portion of the housing. A latching mechanism is attached to the second end o the base member for releasably engaging a latch receiving portion of the housing and the mounting clip is attached to the base member.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

BRIEF DESCRIPTION OF THE DRAWINGS

FIG. 2 is an exploded view of the belt clip assembly of the present invention.

FIG. 3 is a more detailed view of the latching mechanism of the present belt clip assembly showing a screwdriver or other small tool being utilized to release the latching mechanism.

FIG. 4 shows an alternate embodiment of the present invention having a very low profile which may be implemented at low cost.

FIG. 5 is an alternate embodiment of the present invention in which an alligator style mounting clip is coupled to the base member by a lanyard.

DETAILED DESCRIPTION OF THE PREFERRED EMBODIMENT

Figure 1:
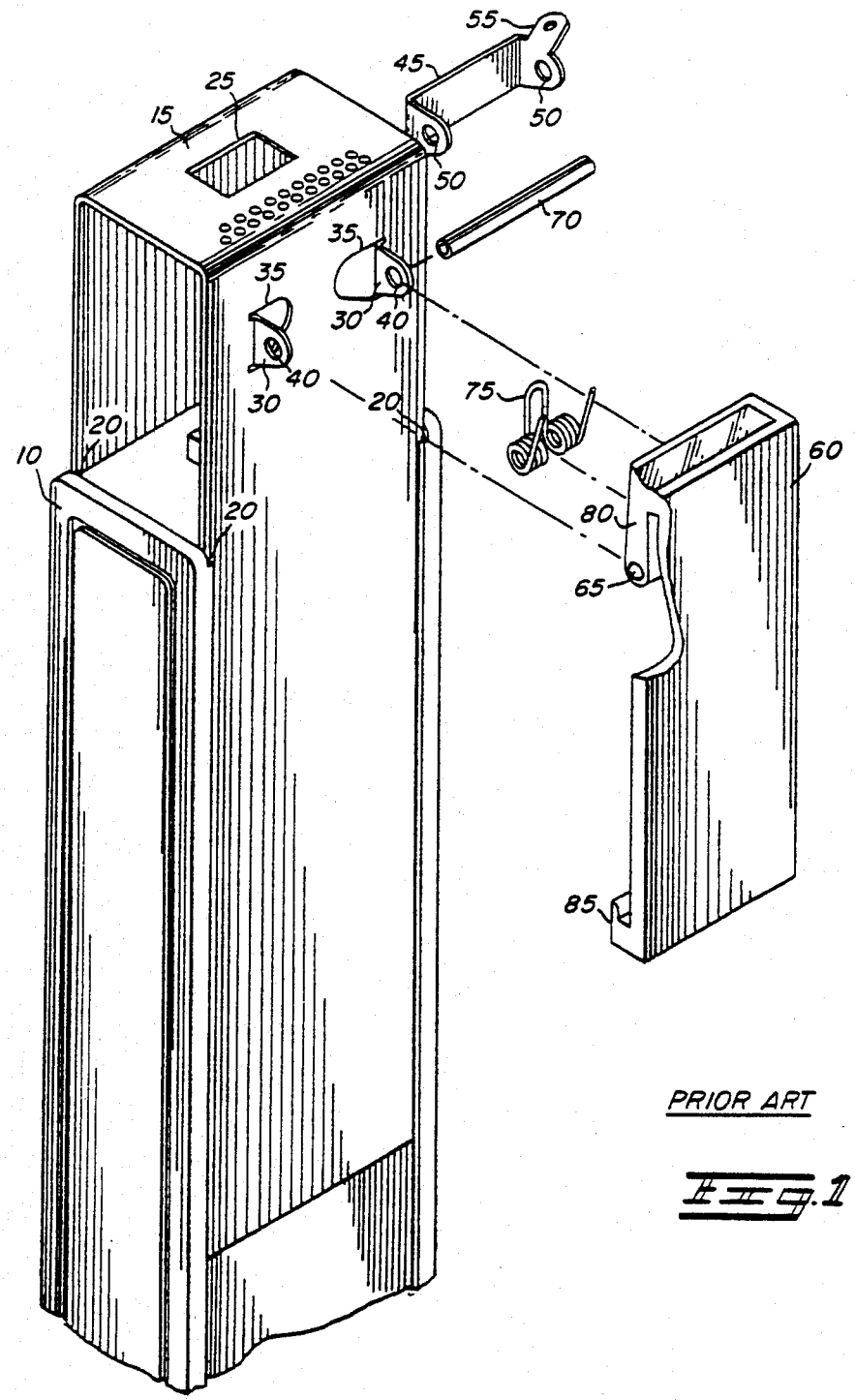
FIG. 1 is an exploded view of a belt clip arrangement of the prior art including a cutaway portion of the belt clip.

Turning now to FIG. 2 an exploded view of the belt clip arrangement of the present invention is shown. In the preferred embodiment the invention is practiced in conjunction with a pager housing 100. In this embodiment the paging receiver includes several controls, switches, or indicators 105 situated on its top surface. Also situated on the top surface is grill-work 110 which is utilized to port the pager's annunciator to the outside of the pager housing so that the the user is better able to hear when he is being paged. Housing 100 may be made of plastic and may include an upper housing portion 115 and a lower housing portion 120 which are normally joined together but separate upon disassembly of the receiver housing. A joining line 125 results and it is preferrably disguised by the pager's ornamental design.

In the preferred embodiment, an additional slot 130 is provided adjacent the grill-work 110 in a manner such that slot 130 appears to be (or actually is) a portion of that grill-work. A pair of wedge-shaped protuberancies or bosses 135 are situated at at the lower portion of housing section 120. More or less than two such bosses may be preferrable in some embodiments.

The belt clip style mounting clip arrangement of the present invention is shown generally as 150 and includes a base member 155 having a hook 160 (shown more clearly in FIG. 5) at one end. Hook 160 is of an appropriate dimension to mate in slot 130 so that hook 160 and slot 130 form a mechanical coupling mechanism. At the lower end of base member 155 a pair of apertures 165 (also more clearly shown in FIG. 5) are located. Mounting clip 170 is mounted to the base member to be used in attaching the pager to the person.

Attachment of belt clip assembly 150 to the housing 100 is accomplished by first inserting the hook 150 within slot 130. The length of base member 155 is such that it now comes in contact with protuberancies or bosses 135. Application of a slight amount of pressure to the bottom portion of base member 155 will cause it to slide up the wedgelike shape of bosses 135 and eventually lock in position with bosses 135 protruding through and engaging apertures 165.

The base member 155 is preferrably made of a resilient metal such as spring tempered stainless steel or other metal having spring characteristics so that it will spring properly into place when it is fully engaged over the wedge shaped protuberancies. A thickness of approximately 0.025 inches for base member 155 has been found suitable for this purpose. This spring action latches the lower portion of assembly 150 to the housing.

When engaged in place, assembly 150 tends to urge the two housing portions 115 and 120 together and thereby provides a reinforcing structure to the entire housing assembly. It should be clear that the two housing portions are normally securely attached so that the belt clip assembly may be removed without affecting the operation of the pager. In some applications it may be desirable to reinforce the base member with a strengthening rib (not shown) to prevent bending. It will also be clear to those skilled in the art that other latching mechanisms may be substituted for those specifically disclosed herein.

Turning now to FIG. 3 a more detailed view of the lower portion of mounting member 155 and housing member 120 is shown. In this figure bosses 135 are shown to be engaged within apertures 165. Also shown in FIG. 3 is a screwdriver or similar disassembly tool 175 being inserted under the lower portion of base member 155 as part of the process of removing the assembly 150 from the housing. The screwdriver 175 is engaged beneath the body member 155 and the body member is pried upward until apertures 165 clear the tops of bosses 135. When the lower portion of body member 155 disengages, hook 160 may then be readily withdrawn from slot 130. In this manner the clip assembly 150 may be removed from the housing if the user desires to use the housing without being encumbered by the clip assembly.

In the preferred embodiment it will be clear that the slot 130 is made to be inconspicuous when used without clip assembly 150 as are protuberancies 135. In this manner, the belt clip assembly can be removed without causing serious degradation of the physical appearance of the electronic apparatus. It is also clear that this is accomplished without leaving clip retaining tabs etc. on the housing which might result in user discomfort when carrying the apparatus within a clothing pocket.

While the belt clip assembly of FIG. 2 provides a low profile and effective mounting clip assembly, an even lower profile clip arrangement is shown in FIG. 4. This cantelever spring type mounting clip arrangement also includes a body member 155, along with hook members 160 (not shown) and apertures 165 (also ot shown) to form the appropriate latching mechanism. In this low profile mounting clip arrangement, the mounting clip is formed by stamping a central portion from body member 155. After stamping this portion of the body member, the clip is bent into a somewhat S-shaped configuration as shown in FIG. 4 to form clip 190.

The upper portion of clip 190 remains attached to the upper portion of body member 155 and is bent outwardly therefrom. It then turns back towards body member 155 and extends through the opening left by the stamping operation. Clip 190 finally extends back outside the body member 155 to allow for ease of inserting the clip around a belt or other article of clothing. This stamping and bending operation results in an extremely low profile cantelever spring type mounting clip which can be produced at very low material and labor costs.

Turning now to FIG. 5, yet another embodiment of the present invention is shown. As used herein the term mounting clip is used to mean any variety of mounting mechanisms such as may be when used in conjunction with a portable hand-held electronic apparatus such as the pager of the preferred embodixent. In this embodiment an alligator style clip 200 is utilized as the mounting clip. The alligator clip 200 is coupled to a split ring 205 which is in turn attached to a lanyard 210. The other end of lanyard 210 is preferrably coupled to a second split ring 215. Split ring 215 is preferrably attached to body member 155 by a retainer 220 which is formed in a somewhat similar manner as clip 190 of FIG. 4. Those skilled in the art will recognize that many alternatives to the present mechanism for mounting the lanyard clip assembly are possible.

Thus, it is apparent that in accordance with the present invention, an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly it is intended that the present invention embrace all such alternatives, modifications, and variations as fall within the spirit and broad scope of the appended claims.

What is claimed is:

1. A detachable mounting clip and housing arrangement especially suited for use with a portable hand-held apparatus to be worn on the person, comprising:
    a housing having upper and lower opposed end walls, one of said end walls including a slot, the other of said end walls including at least one boss,
    a base member having first and second opposed ends and including a hook attached to said first end of said base member, the hook being selectively receivable in said slot, and said second end including aperture means for selectively receiving said boss, for coupling the base member to the housing with spring pressure, and
    a clip operatively carried by said base member.

2. The detachable mounting clip and housing arrangement of claim 1 wherein:
    said other of said end walls includes two bosses, and
    said aperture means includes two apertures, selectively receiving said two bosses.

3. The detachable mounting clip and housing arrangement of claim 2, wherein said bosses are wedge shaped, and the aperture means contacts and slides up the wedge-shaped bosses to receive the bosses in the apertures.

4. The detachable mounting clip and housing arrangement of claim 1, wherein said housing further indicates an area of grill-work adjacent said slot so that said slot appears to form a part of said grill-work when said hook is disengaged from said slot.

5. The detachable mounting clip and housing arrangement of claim 1 wherein said base member is made of a material having spring characteristics so that engagement of said hook and said aperture means respectively is maintained by spring pressure of the base member.

6. The detachable mounting clip and housing arrangement of claim 5, wherein said housing includes two housing sections and wherein said slot is situated on one of said housing sections and said boss is situated on the other sie of said housing sections so that spring pressure of the base member tends to urge the two housing sections into mechanical engagement.

7. The detachable mounting clip and housing arrangement of claim 1 wherein said mounting clip is a belt clip style mounting clip.

8. The detachable mounting clip and housing arrangement of claim 1, wherein said mounting clip is a cantelever spring type mounting clip formed from a central portion of said base member by a stamping and bending operation.

9. The detachable mounting clip and housing arrangement of claim 1, wherein said mounting clip includes an alligator style mounting clip attached to said base member by a lanyard.

10. A method of attaching and detaching a mounting clip to a housing; said mounting clip including a base member having a hook attached to a first end and a pair of apertures on a second end; said housing including upper and lower opposed ends having a slot on on of said ends and a pair of wedge-shaped bosses on the other of said ends; said method including the steps of:
    inserting said hook within said slot;
    sliding said second end up said wedge-shaped bosses until said apertures engage said bosses;
    placing a portion of a prying tool between said base member and said housing near said second end; and
    prying said apertures out of engagement with said bosses.

* * * * *